United States Patent
Feng et al.

(10) Patent No.: US 8,374,009 B2
(45) Date of Patent: Feb. 12, 2013

(54) MULTI-LEVEL PARALLEL PHASE CONVERTER

(75) Inventors: Frank Z. Feng, Loves Park, IL (US); Waleed M. Said, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 395 days.

(21) Appl. No.: 12/731,280

(22) Filed: Mar. 25, 2010

(65) Prior Publication Data

US 2011/0235376 A1    Sep. 29, 2011

(51) Int. Cl.
*H02M 7/00*    (2006.01)

(52) U.S. Cl. ......................................................... 363/65

(58) Field of Classification Search ..................... 363/65, 363/71, 72, 131
See application file for complete search history.

(56) References Cited

U.S. PATENT DOCUMENTS

| | | | |
|---|---|---|---|
| 5,198,971 A * | 3/1993 | Recker et al. .................. 363/71 |
| 5,311,419 A | 5/1994 | Shires | |
| 5,434,771 A * | 7/1995 | Danby et al. .................. 363/71 |
| 5,642,275 A | 6/1997 | Peng et al. | |
| 6,084,786 A | 7/2000 | Rozman | |
| RE37,126 E | 4/2001 | Peng et al. | |
| 6,442,210 B1 | 8/2002 | Pennell | |
| 6,510,063 B2 * | 1/2003 | Kobayashi et al. ............. 363/41 |
| 6,574,125 B2 * | 6/2003 | Matsukawa et al. ............ 363/71 |
| 6,751,106 B2 | 6/2004 | Zhang et al. | |
| 7,277,304 B2 * | 10/2007 | Stancu et al. ................... 363/71 |
| 7,372,712 B2 * | 5/2008 | Stancu et al. ................... 363/71 |
| 7,433,214 B2 | 10/2008 | Kunow et al. | |
| 7,479,746 B2 | 1/2009 | Rozman et al. | |
| 7,489,487 B2 | 2/2009 | Oka | |
| 7,518,886 B1 * | 4/2009 | Lai et al. ......................... 363/17 |
| 7,596,008 B2 * | 9/2009 | Iwata et al. ..................... 363/71 |
| 7,633,770 B2 | 12/2009 | Datta et al. | |
| 7,643,319 B2 * | 1/2010 | Wagoner ......................... 363/65 |
| 7,656,689 B2 * | 2/2010 | Yoshimoto et al. ............ 363/71 |
| 7,852,643 B2 * | 12/2010 | Zhang et al. .................... 363/65 |
| 7,994,750 B2 * | 8/2011 | Wagoner et al. ............. 318/800 |
| 8,018,746 B2 * | 9/2011 | Okui ................................ 363/71 |
| 8,031,495 B2 * | 10/2011 | Sachdeva et al. .............. 363/71 |
| 8,040,081 B2 * | 10/2011 | Shimana ......................... 318/34 |
| 8,097,970 B2 * | 1/2012 | Hyvarinen ....................... 290/44 |
| 2006/0221653 A1 | 10/2006 | Lai et al. | |
| 2007/0230226 A1 | 10/2007 | Lai et al. | |
| 2012/0092908 A1 * | 4/2012 | Piotr et al. ...................... 363/71 |

FOREIGN PATENT DOCUMENTS

WO    2007/103651    9/2007

* cited by examiner

*Primary Examiner* — Adolf Berhane
(74) *Attorney, Agent, or Firm* — Carlson, Gaskey & Olds PC

(57) ABSTRACT

A multi-level parallel phase power converter has a power source, a converter, and an electrical node. The converter includes multiple converter modules. Each of the converter modules has multiple multi-level power converters, a poly-phase interphase inductor, and a set of poly-phase power summing connections. The summed power of each of the multiple converter modules are connected together to form a single poly-phase power converter.

14 Claims, 3 Drawing Sheets

MULTI-LEVEL PARALLEL PHASE CONVERTER

BACKGROUND OF THE INVENTION

The present disclosure is directed to the field of electric power converters, and more specifically to a multi-level parallel phase converter.

Conventional power systems, such as those found in electric aircraft, include a power converter to convert DC power into a poly-phase format These systems also include a passive filter. The passive filter is designed to filter out noise introduced into the system as a result of the power switching action. The power converter may "pre-clean" the power. Pre-cleaning removes at least a portion of the electrical noise from the power prior to the passive filter.

SUMMARY OF THE INVENTION

Disclosed is a multi-level power converter which has a power source, a DC/AC converter, and an electrical node. The converter is coupled to the power source and includes multiple converter modules. Each of the converter modules has multiple multi-level power converters, a poly-phase interphase inductor, and a set of poly-phase output connections. Each of the multi-level power converter has power line connected to the poly-phase interphase inductor. The electrical node connects each of the connections in the sets of poly-phase output connections to form a single set of poly-phase connections.

A plurality of parallel converter modules converts the power into a square wave output which is then passed through a corresponding interphase inductor to from a power output.

These and other features of the present invention can be best understood from the following specification and drawings, the following of which is a brief description.

DETAILED DESCRIPTION OF THE PREFERRED EMBODIMENT

Figure 1:
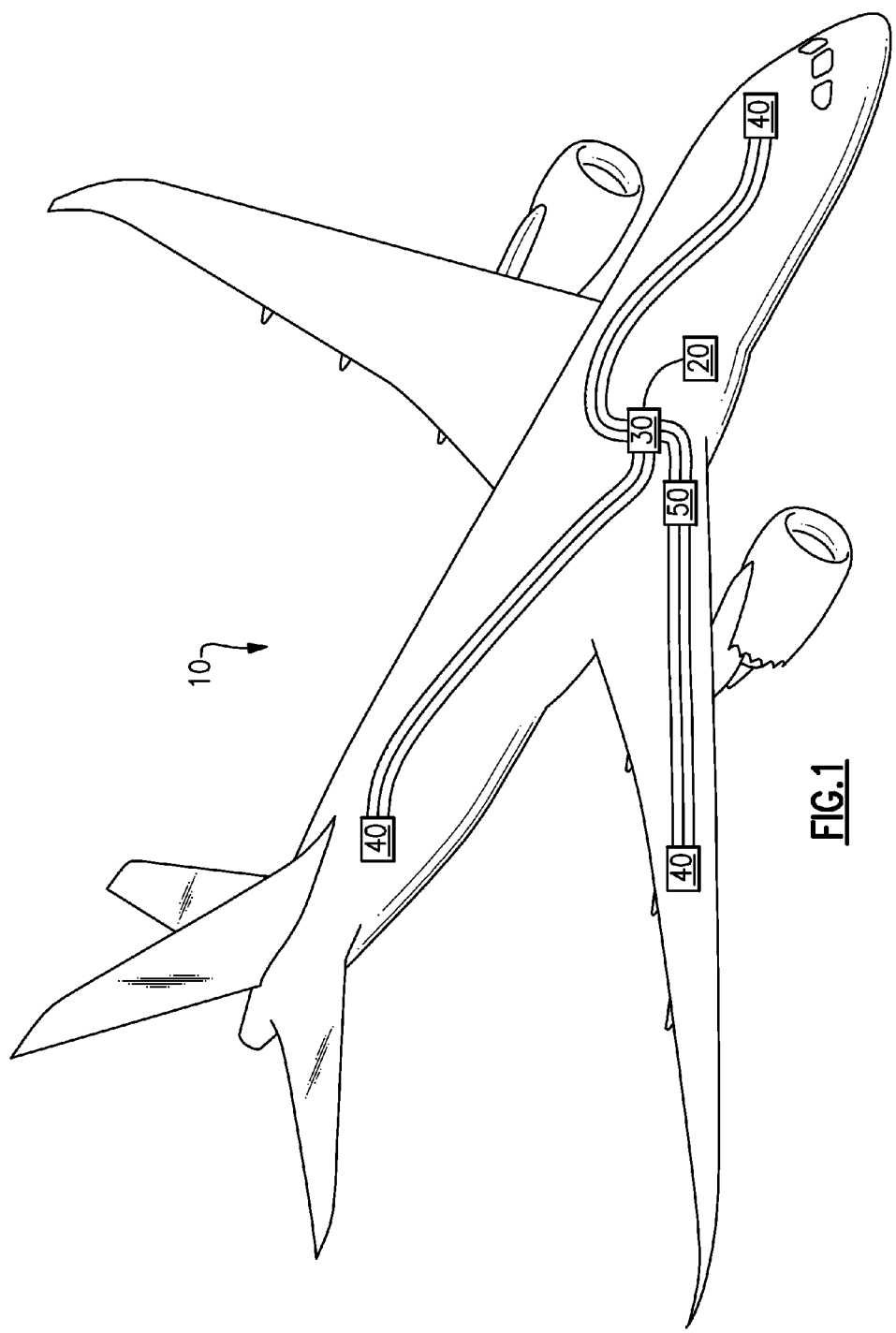
FIG. 1 schematically illustrates an aircraft power generation system using a multi-level inverter.

FIG. 1 illustrates an example aircraft 10 using a power conversion system to convert DC power to AC power. The aircraft 10 includes a DC power source 20, which supplies power to a multi-level poly-phase converter 30. The multi-level poly-phase converter 30 converts the power into a poly-phase format, such as three-phase, and removes electrical noise from the power. The power is then transmitted to on-board electrical components 40 which utilize AC power, thereby powering the electrical components 40. Additional noise filtering, such as an inductance-capacitance (LC) passive filter 50, can be included after the multi-level poly-phase converter 30 and before the on-board electrical component 40 to further clean the power signal of electrical noise.

Figure 2:
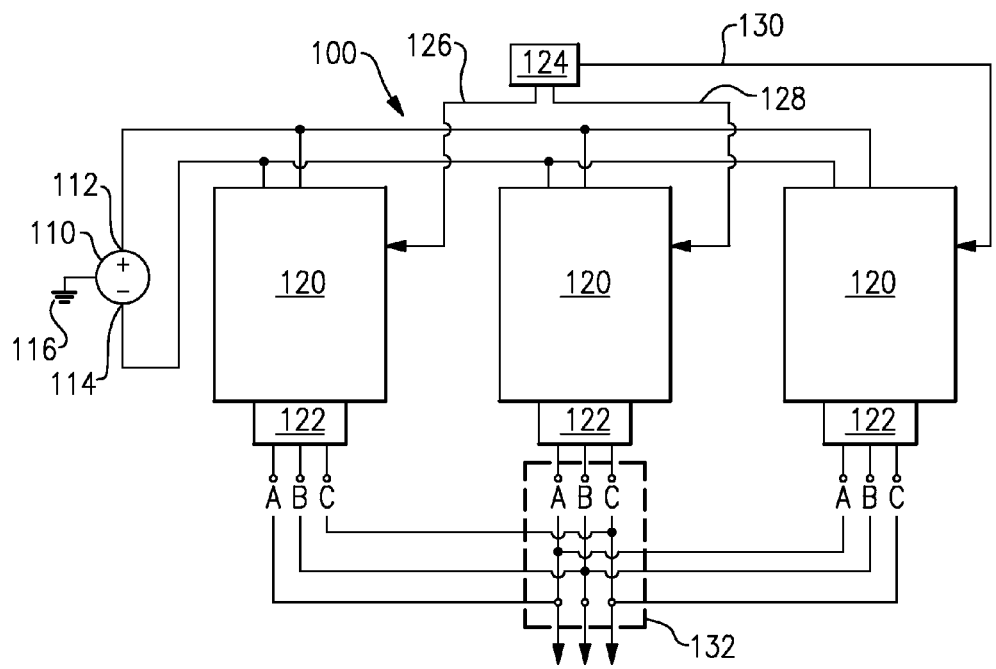
FIG. 2 schematically illustrates a basic level diagram of an example multi-level converter.

Illustrated in FIG. 2 is an example multi-level parallel phase converter 100 which has a DC power source 110 connected to three identical converter modules 120. Each of the converter modules 120 have an interphase inductor 122 which outputs power on three phase lines 122A, 122B, 122C (also referred to as power lines). The DC power source 110 has a positive side 112, a negative side 114, and a connection to ground 116. The illustrated DC power source 110 can be two DC sources connected by a ground connection, thereby providing both a negative voltage DC source 114 and a high voltage DC source 112. The multi-level parallel phase converter 100 is referred to as a parallel phase converter because each of the converter modules 120 is connected in a parallel configuration.

The pulse width modulation creates an AC power output staircase wave. The staircase wave is passed through the interphase inductor 122, and the resulting power is output on the phase outputs 122A, 122B, 122C. The corresponding phase outputs 122A, 122B, 122C of each converter module 120 are connected together to form a combined AC power output for the overall system at a combination node 132. The combined AC power output has a current equal to the sum of the current of each of the individual converter modules 120. By way of example, phase A 122A of each of the interphase inductors 122 would be connected to each other phase A 122A, phase B 122B would be connected to each other phase B 122B, and phase C 122C would be connected to each other phase C 122C.

The converter modules 120 are connected to the DC power source 110 parallel to each of the other converter modules 120, thereby allowing for concurrent power conversion. The converter system 100 also has a controller 124 which controls each of the converter modules 120. The controller 124 outputs a control signal which controls the switching of the multi-level inverters 222, 224, 226 (illustrated in FIG. 3) contained within each converter module 120.

The introduction of converter modules beyond two requires the introduction of a phase offset in the control signal, and therefore prevents the converter module 120 outputs from being summed together while a control phase component is present on the output signal. By way of example, for a system which has N converter modules 120 (where N is any positive integer number), the carrier phase shift between modules is $$\theta_i = i \cdot (N-1) \frac{2\pi}{N},$$

where i is the ith converter module 120 in the system, i=0, 1, 2 . . . , N−1. As can be seen, if there are two converter modules 120, N=2, and the phase shift is between the modules is π, or 180 degrees, and an increase in the number of modules will be accompanied by a corresponding change in the phase shift.

The size of an attached passive filter in power converter system, such as LC passive filter 50 of FIG. 1, depends upon the frequency of the noise in AC power of the converter 20. A higher noise frequency generally results in a smaller size requirement for a passive filter. The noise frequency of the power output of the multi-level parallel phase converter 100 of FIG. 2 is related to number of converter modules 120 and the common switching frequency. The addition of the interphase inductor 122 allows additional converter modules 120 to be connected beyond two, and therefore also allows for the system to utilize a higher frequency than could be used with a converter using two modules.

As an example, if each converter module 120 is capable of switching at 10 kHz, a converter system having two three-level converter modules 120 is limited to producing an effective switching frequency of 40 kHz (4×10 kHz). The addition of multiple converter modules 120 beyond two, allows the effective switching frequency of the output signal to increase in corresponding amounts. The effective switching frequency is at least 2×N×10 kHz, where N is equal to the number of converter modules. The above described frequency values are exemplary only, and are not intended in a limiting sense.

Alternately, the additional converter modules 120 can add redundancy to the power converter 30. In a redundant system, excess converter modules 120 are installed. When one of the operating converter modules 120 becomes damaged, or otherwise ceases to function, the remaining converter modules 120 continue to operate with a net reduction in output power.

Figure 3:
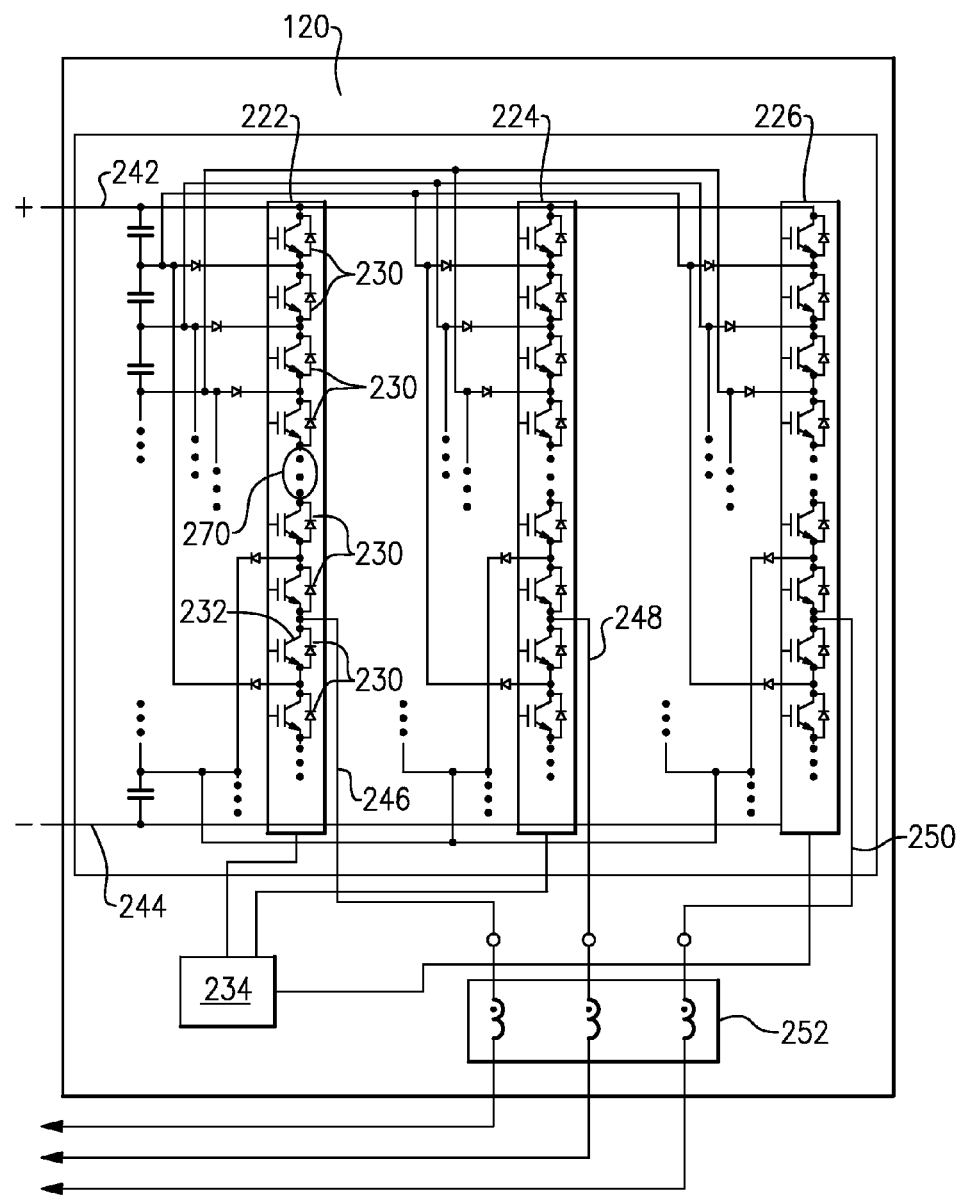
FIG. 3 schematically illustrates a sample multi-level DC/AC converter module for an aircraft power system.

FIG. 3 illustrates a schematic description of a converter module 120 which could be used in the multi-level converter 100 illustrated in FIG. 2. The converter module 120 includes a set of poly-phase multi-level inverters 222, 224, 226. The illustrated converter module 120 generates three phase power. However, if a different number of phases is desired, additional multi-level inverters 222, 224, 226 can be included equal to the number of additional phases. By way of example, if a six phase system is desired, the converter module 120 will include six multi-level inverters 222, 224, 226.

Each of the multi-level inverters 222, 224, 226 has a series of semiconductor switch/diode pairs 230. The switching of transistors 232 within the transistor/diode pairs 230 is controlled by an on-board converter module controller 234. Alternately, the switching can be controlled by an external controller which is connected to the converter module 120, such as controller 124 of FIG. 2. As indicated by the ellipses 270 in FIG. 3, the multi-level converters 222, 224, 226 can have any number semiconductor switch/diode pairs 230, and the specific number of pairs 230 can be determined by a person of ordinary skill in the art to achieve a desired output frequency and voltage.

Each of the multi-level inverters 222, 224, 226 is also connected to a +DC source 242 and a −DC source 244. The switching action of the semiconductor switch/diode pairs 230 creates a multi-level staircase waveform at each of the multi-level inverters 222, 224, 226. Each of the levels in the multi-level inverters 222, 224, 226 are summed together and output as a single power output 246, 248, 250. The power outputs 246, 248, 250 of each multi-level converter 222, 224, 226 are then passed through an interphase inductor 252 and a leakage inductance of the interphase inductor 252 blocks circulating current between the multiple converter modules 120. The interphase inductor 252 represents an embodiment of the interphase inductor 122 of FIG. 2.

The converter module controller 234 provides an output control signal to each of the transistor/diode pairs 230 using a triangle shaped carrier wave. A carrier wave is a cyclical electrical signal which can be modulated to contain data or control information. Due to its cyclical nature, a carrier wave imparts a phase shift on the controlled system. Since each of the controlled converter modules 120 receive independent control signals, the phase shifts imposed on each phase of the output signal by the carrier wave differs between the converter modules 120. When only two converter modules 120 are used the phase shifts can be designed to be 180 degrees apart, and the output signals can be added together without interference by the phase shifts.

Figure 4:
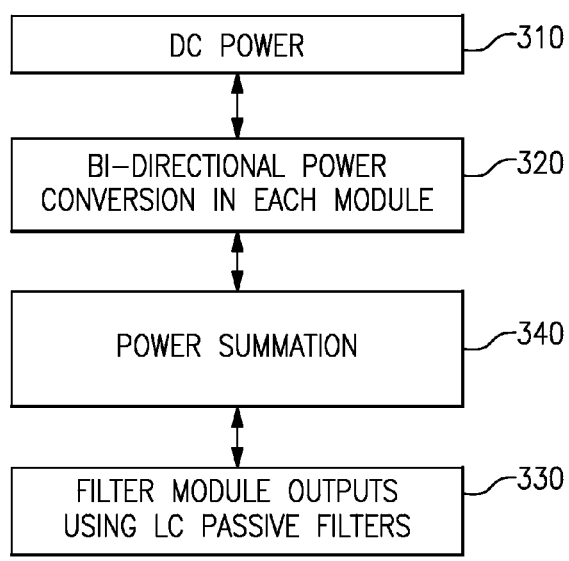
FIG. 4 illustrates a flowchart of a process by which a power is pre-cleaned.

An example process, by which the above described power conversion is made, is illustrated in the flowchart of FIG. 4. The multi-level parallel phase power converter initially accepts DC power 310. The DC power is then converted into multiple square-wave AC power outputs in each module step 320. The power outputs are combined at 340 on an electrical node into a single combined power output in the power summation step 340. Each of the converter modules additionally filters the AC power outputs to remove any electromagnetic noise and to convert the signals into a sinusoidal wave in the filter module step 330.

While the above example is described with regards to a conversion from a DC to an AC signal, a person having ordinary skill in the art could reverse the connections and, with minor modifications, convert an AC power to a DC power using the above described power converter. This functionality is referred to as "bi-directionality." The bi-directionality allows power to be connected at either the AC connections to the parallel phase converter, or at the DC connections of the parallel phase converter.

Although an embodiment has been disclosed, a worker of ordinary skill in this art would recognize that certain modifications would come within the scope of this invention. For that reason, the following claims should be studied to determine the true scope and content of this invention.

What is claimed is:

1. A multi-level parallel phase power converter comprising:
   a power source;
   a power converter coupled to said power source and having a plurality of converter modules comprising multi-level power converters, a poly-phase interphase inductor, and poly-phase output connections, each of said multi-level power converters having a power line connected to said poly-phase interphase inductor; and
   an electrical node connecting each of said poly-phase output connections, thereby forming a single poly-phase power converter output; and
   wherein said poly-phase interphase inductors are configured to remove a carrier phase component from each of said connected power lines.

2. The multi-level parallel phase power converter of claim 1, wherein said power converter includes two of said converter modules.

3. The multi-level parallel phase power converter of claim 1, wherein each of said converter modules has a number of multi-level power converters equal to a number of output phases of the multi-level power converter.

4. The multi-level parallel phase power converter of claim 1, wherein said single poly-phase power converter is a three phase power configuration.

5. The multi-level power converter of claim 4, wherein each of said converter modules has three of said multi-level power converters.

6. The multi-level power converter of claim 4, wherein each of said converter modules is connected in parallel.

7. The multi-level parallel phase power converter of claim 1, wherein said power converter is capable of converting AC power to DC power.

8. The multi-level parallel phase power converter of claim 1, wherein said power converter is capable of converting DC power to AC power.

9. The multi-level parallel phase power converter of claim 8, wherein said power converter additionally is capable of converting AC power to DC power, said converter being arranged such that power may be connected at either an AC or DC input.

10. The multi-level parallel phase power converter of claim 9, wherein each of said poly-phase interphase inductors has a leakage inductance, and each of said leakage inductances are configured to remove said carrier phase component from each of said connected lines.

11. The multi-level parallel phase power converter of claim 1, further comprising redundant converter modules such that said power converter can function while at least one converter module is inoperable.

12. The multi-level parallel phase power converter of claim 1, wherein each of said power converter modules is operated at a given switching frequency and an output noise frequency on said electrical node is equal to at least two times the number of converter modules multiplied by the given switching frequency.

13. A method for converting power comprising the steps of;

inputting a DC power into a multi-level parallel phase converter comprising a plurality of converter modules;

each of said converter modules converting said DC power signal into a poly-phase staircase wave power signal;

combining each of said poly-phase staircase wave power in an interphase inductor, and removing a carrier phase from said poly-phase staircase wave power using said interphase inductor, thereby creating an output power; and filtering said output power signal in a passive filter, thereby creating a filtered output power.

14. The method of claim 13, wherein said step of combining each of said poly-phase staircase wave power in an interphase inductor comprises removing current circulating between the plurality of converter modules.

* * * * *